3,212,053
SONAR SYSTEM
William J. Finney, % Naval Research Laboratory,
Washington, D.C.
Filed Sept. 25, 1950, Ser. No. 186,626
12 Claims. (Cl. 340—3)

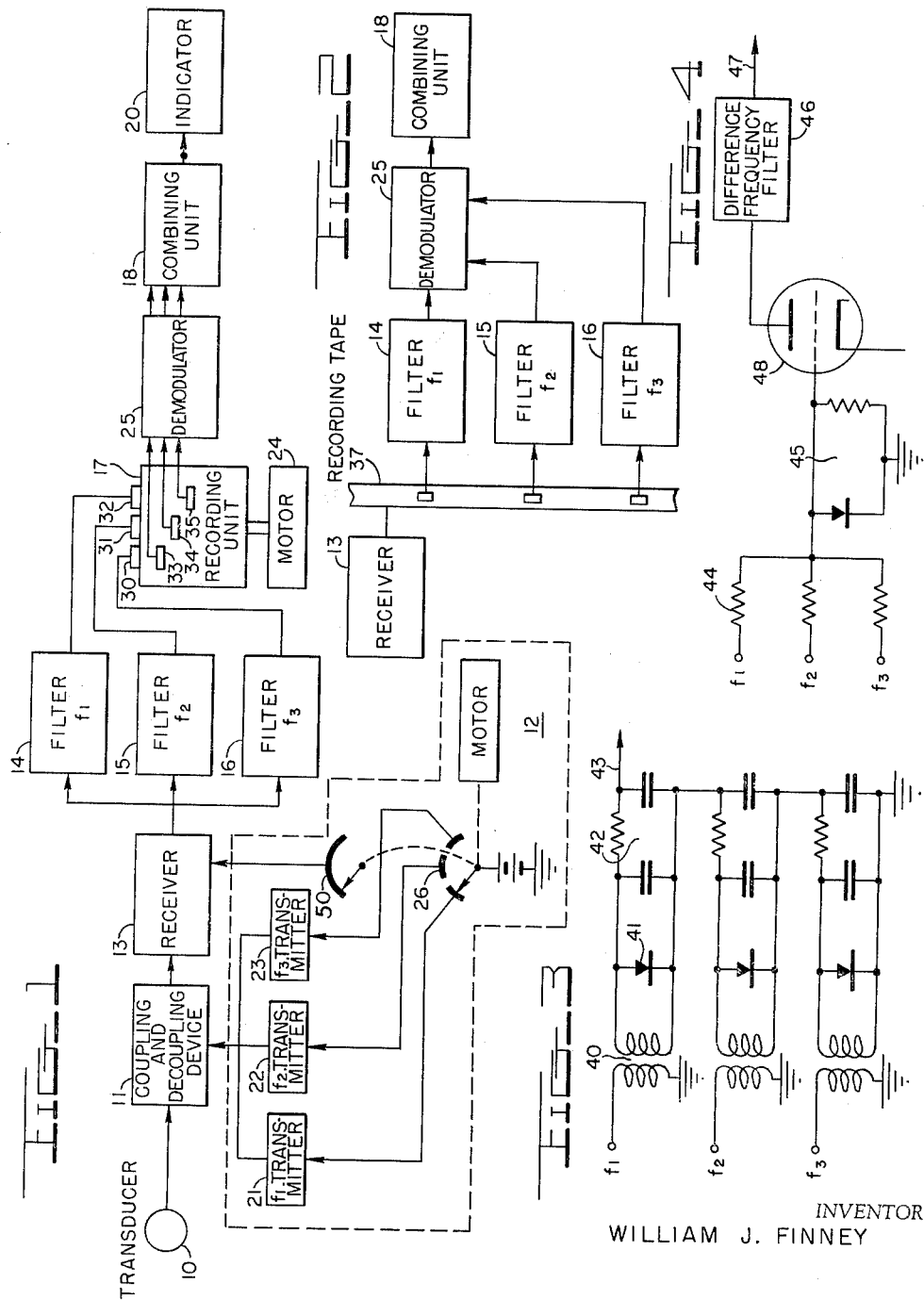

This invention relates in general to a pulse echo signal locator system and in particular to method and means of increasing recognition of detected echoes from remote objects.

In the conventional radio signal locator system such as those known as radar, the signal to noise ratio in many instances may be so small as to render the detection and recognition of remote objects practically impossible. However, since these systems have high pulse repetition rates, a considerable increase in signal to noise may be obtained by simply integrating a great number of pulses. This is, of course, a reasonable method of accomplishing the desired objective wherein pulses of electromagnetic energy having a high velocity of propagation are employed. In certain other systems, however, such as in sonar, wherein acoustical underwater equipment is employed, one of the factors most severely limiting the application of these more advanced electronics techniques to the detection of weak signals is the low velocity of sound propagation in water. At target ranges of a few thousand yards, several seconds are required for the transmitted pulse of acoustic energy to reach the target and be reflected to the source. Thus at a maximum target range of 10,000 yards and a velocity of propagation of 5000 feet per second, at least 12 seconds elapse between target echoes. This yields a pulse repetition rate of less than 0.1 per second, as compared with the 400 to 1600 pulses per second used in conventional radar equipment, and hence, makes impracticable in most circumstances the use of effective multiple pulse integration for sonar target detection.

The present invention readily adapts itself to a sonar pulse echo locator system, but it is to be understood that it is not to be thusly limited as it primarily concerns itself to a method of and means for increasing the recognition of a detected object by increasing the rate at which information, in the form of reflected energy travelling at a relatively low velocity, may be obtained.

It is accordingly an object of the present invention to provide a new and improved pulse echo signal locator system.

It is a further object of the present invention to provide a new and improved signal locator system wherein remote objects may be more readily detected.

Another object of the present invention is to provide a new and improved signal locator system wherein recurrent echo signals reflected from a remote object may be readily distinguishable from randomly occurring signals.

Another object of the present invention is to provide a system having an increased rate of flow of information as to the location of a detected object.

Further objects and attainments of the present invention will become apparent from the following detailed description when taken in conjunction with the drawings in which:

FIG. 1 is a block schematic diagram illustrative of a preferred embodiment of the invention.

FIG. 2 is an alternative embodiment shown in block schematic of the filtering and recording of detected pulse echoes as shown in FIG. 1.

FIGS. 3 and 4 are simplified diagrams of variant embodiments of the combining unit 18 of FIG. 1.

In accordance with one aspect of the present invention the exploratory signals of a pulse echo system are transmitted as a pulse group with each group comprising a predetermined number of predetermined time spaced pulse signals. The individual pulse signals comprising the groups each have a distinct frequency one from the other to permit ready identification and separation at the receiver. The echoes reflected from a remote object are then received and separated by a plurality of frequency sensitive filters each having a resonant frequency corresponding to the frequency of the respective transmitted pulses. The separated signals are then fed to a delay device, wherein they are delayed in time in accordance with their sequence of transmission and the predetermined time spacing between the pulses. The signals after the proper delay are applied to a combining unit to render a single composite signal composed of the plurality of signals occurring now simultaneously in time. This signal is then applied to an appropriate indicating device to indicate its presence.

Referring now in particular to FIG. 1 there is shown a typical embodiment in block form of the present invention incorporated in a sonar signal locator system. Transducer 10 is operative to convert the periodically recurring pulses of electrical energy obtained from the output of keyer and transmitter 12 into pulses of sound energy and during reception operates to convert sound energy into electrical energy. Transducer 10 is conventional in design and is well known to those in the sonar art. A transducer 10 is shown here, for purposes of illustration only, as to render the system of the present invention applicable to the transmission and reception of energy in water. The system as described, however, may readily adapt itself to the propagation of radio frequency energy into free space. In this case, of course, transducer 10 may be readily substituted by an antenna of known design.

The coupling unit illustrated at 11 is also of conventional design and isolates the transmitter 12 electrically from the transducer 10 during reception intervals and protects the receiver 13 from transmitter 12 during transmission. Keyer 26 shown as a motor driven commutator and transmitter 12 are also of known design and are operable to transmit a group of pulse signals, each of the group having a distinct frequency with a predetermined time spacing therebetween. As an example, to further illustrate the present invention with respect to sonar, transmitter 12 may comprise three transmitter oscillators 21, 22 and 23 which are sequentially keyed by sequential keyer 26 to transmit three pulses say at a frequency of 23 kilocycles, 25 kilocycles and at 27 kilocycles respectively with a one second time interval between pulses. The spacing between groups of pulses is so chosen that the echo from the first pulse is received from a target of a certain range after the third pulse is transmitted as fully described hereinafter. It is understood of course that any number of pulses may comprise the group and not depart from the present invention. It has been found in practice when transmitting and receiving at these frequencies, that the reflected signals, from a moving detected object, may vary in frequency from that of the transmitted pulse as much as two percent in certain instances. It is necessary, therefore, that the frequency separation between the pulses of the group be sufficiently great to accommodate this frequency deviation of the reflected pulses.

The pulses transmitted are spaced with a predetermined time interval. In general and as fully described hereinafter the time interval between transmitted pulses and the maximum pulse group spacing is controlled by the number of pulses used and by the target range at which maximum detection efficiency is desired. This is apparent from a consideration of the number of echoes received from targets at the various ranges for a given pulse separation in time. The minimum pulse spacing is determined by the time required to recharge the power supply storage system when energy storage is used, or by the minimum time separation which materially reduces background coherence. In general, any time separation greater than a few hundred milliseconds will satisfy the latter requirement.

Receiver 13 is a conventional linear response receiver having sufficiently broad-banded reception to receive the group of echo signals reflected by remote objects from the transmitted pulses of various frequencies. The output of receiver 13 is applied in parallel to a number of filters corresponding to the number of pulses in the group transmitted. Each of the filters is a bandpass filter with the center of its resonant frequency corresponding to the frequency of a different one of the transmitted pulses and having a bandwidth sufficient to accept the anticipated Doppler shift of frequency. Each filter, therefore, is operable to pass only the received reflected echo signals of a corresponding one of the transmitted pulses. Filters 14, 15 and 16 may be an LC filter or any other filter known to those skilled in the art having a passband sufficiently large to accommodate the frequency deviation hereinbefore mentioned. The center frequency of filter 14 is at 23 kilocycles in the exemplary embodiment to correspond to the first transmitted pulse, and the center frequency of filter 15 is at 25 kilocycles to correspond to the second transmitted pulse and the center frequency of filter 16 is at 27 kilocycles to correspond to the third transmitted pulse. The passband of the filters 14, 15 and 16 must not be so large, however, as to overlap the frequencies embraced by the adjacent filters but only large enough to accommodate for the Doppler frequency shift.

The output of the receiver 13 after frequency separation through filters 14, 15 and 16 is applied to a signal storage unit 17. Storage unit 17 in the particular constructed embodiment applicable to sonar, is a magnetic tape recording device, driven by motor 24. The output of each of the filters 14, 15 and 16 is applied to a recording head 30, 31 and 32 and each of the pulses after proper delay is taken from playback heads 33, 34 and 35. A tape recorder for a delay device was chosen in this instance because of the particular low repetition frequencies employed. A delay line or LC circuits or any other conventional delay means may be used when the system is employed in a conventional signal locator system for purposes other than sonar. A delay line or LC circuits would, of course, attain unreasonably large proportions at sonar repetition frequencies and accordingly are impractical. Storage unit 17 serves to delay each pulse applied from the plurality of filters other than the last, in an amount in accordance with its order of sequence and the predetermined time spacing between transmission of the pulses. As per example, say in this particular instance there is a one second delay between the transmitted pulses, the echo signal received from the first transmitted pulse and applied to storage unit 17 from the first filter 14 would be delayed two seconds, the signal applied from the second filter 15 would be delayed one second, and the signal applied from the third filter 16 would not be delayed appreciably. Of course, the amount of delay of each pulse is dependent on the number of pulses in the group and accordingly the number of filters employed. Storage unit 17, by delaying the signals from the plurality of filters, causes the reproduce signals appearing at heads 33, 34 and 35 to occur simultaneously in time.

It may be mentioned here that in the exemplary embodiment the transmitted pulses are given as equally spaced and accordingly the pulses are delayed in equal steps. It is to be understood that it is not at all necessary that the transmitted pulses be equally time spaced, so long as the variation in spacing is taken in account in the recording unit 17.

Referring now for a moment to FIG. 2 there is illustrated an alternative embodiment in block schematic of the sequence and method of filtering and recording the received signals. The multi-frequency pulse group is transmitted and received in the same manner as previously described. The output of the receiver 13 is applied directly to recorder 37 wherein the signals are recorded on a single track of magnetic tape. The selected time delay of the signals is provided by means of a multiplicity of playback heads spaced in time along the moving magnetic tape in accordance with the time spacing of the original transmitted pulses. Each play-back head is followed by a narrow band filter, passing only the reflections and background associated with a signal from one of the transmitted pulses in such a way that all the echoes from the chain of transmitted pulses will coincide in time at the combined output of the filters.

Referring again to FIG. 1 the delayed pulses from recording unit 17 are fed to demodulator 25 wherein the pulses are demodulated. Demodulator 25 is shown here for purposes of illustration only, as in actual practice it is omitted since combining unit 18 inherently functions also as a demodulator.

From demodulator 25 the selectively delayed pulses are applied to a combining unit 18 which combines the signals resulting from the chain of transmitted pulses. The primary function of combining unit 18 is to produce a single output pulse, however, combining unit 18 further functions in a manner that utilizes the advantages obtainable from the total signal energy and from the increased coherence of the echo signal energy as compared to the background noise signal energy.

By coherence of signals is meant, for the purposes of this application, that relationship between the instantaneous values of two signals that results in a total energy, when they are linearly combined, that is in excess of the algebraic sum of the signals. This excess energy or the energy difference from that of the algebraic sum is known as the interaction energy.

To illustrate the definition of "coherent signals," if two sinusoidal voltages of the same frequency and of the same amplitude are added linearly in such a way that their peaks and their crossover points occur simultaneously, the resultant energy in a resistive load, to which the resultant voltage may be applied, will be four times the energy which would have resulted from the application of either voltage separately. If on the other hand the voltages are added together in opposite phase and applied to the resistive load, the resultant energy would be zero. Again in a third instance if the two voltages are of different frequencies, the resultant energy would be the algebraic sum of the energy resulting from the application of each of the voltages separately. In the above first two instances the voltages are coherent and the resultant energy is considered to be the algebraic sum of the two voltages plus their interaction energy. In the third instance the signals were incoherent and there is no interaction energy.

Also for purposes of this application the definition of "cross-correlation function" of two signals may be termed as a measure of the degree of coherence existing between the two signals. This cross-correlation function, which may be readily determined from known formulae, is a property which is also easily measured by known instruments.

The increase in energy of the coherent echo signals as compared to incoherent background signal energy is readily seen from considering that the character of the echo signal reflected from a detected object is relatively independent of slight changes in time of the order of one second and also independent of slight changes in frequency. It has been found, however, that the coherence or cross-correlation of random phenomena such as noise becomes very small with small changes in time or in the frequency band accepted. Accordingly the high degree of coherence of echo signals reflected from detected objects resulting from the different transmitted pulses may readily be separated from undesired background noise having a low degree of coherence.

Typical combining units which make use of the advantages of both increased signal energy and signal coherence provided by the selective time-delay system are shown in FIGS. 3 and 4. The combining unit shown in FIG. 3 consists of a plurality of rectifier-integrator circuits one each of such circuits being connected to the output of one of the previously described filters. The filtered voltage applied to each of the rectifier-integrator circuits is first passed through transformer 40, for purposes of isolating above ground potential to permit linear combining of the voltages, and then rectified in rectifiers 41 and integrated in integrators 42. The output of each of these circuits is connected in series and combined at point 43 to be applied to a suitable indicator. The voltage appearing at point 43 is not only the sum of the individual filtered voltages but also includes interaction energy as previously described. This resultant composite signal accordingly has a greatly increased signal to noise ratio.

The combining unit shown in FIG. 4 is a conventional heterodyne system utilizing the common difference frequency beat. The incoming filtered signals are fed through resistive element 44 to a single non-linear element 45 and then through vacuum tube 48 to difference frequency filter 46. The function of the heterodyne system of FIG. 4 is to derive a composite signal comprised of the difference frequency of the received pulses and accordingly also includes the interaction energy as previously described.

The output of combining unit 18 is applied to a suitable indicator, such as to the intensity grid of a cathode ray tube indicator or any other type of indicator known to those skilled in the art and illustrated as block 20 of FIG. 1.

As previously mentioned with respect to the transmitted pulse spacing, the limitations on maximum time separation of the pulses in a pulse group is determined by the conditions under which the system is to be applied. For example, if it is decided that eight pulses are required per pulse group and that the full efficiency of the system will be needed for all targets beyond about 8000 yards, then the maximum time interval from the beginning of one pulse to the beginning of the next pulse will be assuming the propagation constant is equal to approximately 5000 feet per second, one second since it is assumed that in most practical cases it will not be desirable to receive and transmit simultaneously (the receiver being kept inoperative by commutator 50 during transmission of the entire group of pulses). Hence, only the echo from the last pulse in a group would be received from targets at ranges of less than 1000 yards since the receiver would be inoperative for the returning echoes of the first seven pulses. Similarly, only the echoes resulting from the last two pulses in a group will be received at ranges of about 1000 to 2000 yards, the receiver being inoperative for the returning echoes of the first six pulses and so on up to eight echoes at ranges beyond about 8000 yards when the receiver is operative to receive all eight pulses. The advantage of this method of pulse grouping and spacing is that the signal to noise ratio is such that at 1000 yards a single pulse is sufficient whereas at 8000 yards the signal level of a single pulse drops well below that of the noise, however with the eight pulses the received energy after being combined in the manner previously described is more than sufficient to detect the object. The detection efficiency of the system thus increases uniformly with target range up to about 8000 yards in this particular instance. Maximum pulse separation for other cases would be determined in a similar manner. The spacing between pulse groups is, of course, such that the last pulse transmitted will be received from an object at maximum range prior to the emission of the first pulse in a succeedant group.

The minimum time separation of the pulses is similarly determined by the conditions of use. When pulses of high power are desired, it is frequently necessary to store electrical energy in the transmitter power supply between pulses in order to provide the desired peak power level. In such cases a sufficient interval must be allowed between pulses to recharge the transmitter storage system. By this means it is possible to get much more total energy into the sound beam and at the same time maintain a much more accurate determination of the target range than is possible with a single long pulse. The signal and background coherence also limits the minimum time separation of the pulses for most efficient performance. These minimum separations are determined from experimental cross-correlation functions between the background noise in the separate frequency bands. The pulse separation should be sufficiently great that the noise cross-correlation is essentially zero at the outputs of the various delay sections. In general however, the recharging of the transmitting storage system requires sufficient time that the background coherence need not be considered as a limiting factor.

As previously stated in setting forth the objects of the present invention, the purpose of the invention is to render more distinguishable the reflected signals from a target object over the sporadic and noise signals. It is apparent from the aforementioned that the present invention provides several advantages over other pulse reflection detection systems for the detection of remote objects in media having low propagation velocity. It provides several independent echoes from the target in much less time than is required by conventional sonar. For example, at 10,000 yards it requires more than 96 seconds to receive eight separate echoes by conventional sonar, while by the selective time-delay method eight echoes can be obtained in about 20 seconds, if as previously described a one second pulse spacing is used. The selective time-delay technique also makes efficient use of its available time, since the number of received echoes, and hence the improvement in the detection probability, increases uniformly with the target range, from one echo for a complete operating cycle at less than 1000 yards range to eight echoes per operating cycle at all target ranges beyond about 8000 yards in the example above. This is a great improvement over the so-called range-gating systems which give an improvement at the predetermined range interval, but reject, all signals occurring outside of the selected interval. Such a system would never yield a detection probability greater than that given by the selective time delay system, and of course, gives a zero probability outside of the range interval for which they are set.

Although certain specific embodiments of this invention have been disclosed and described it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A pulse echo signal system comprising: an impulse transmitter system for transmitting to remote objects a group of time spaced pulses, each having distinct frequency characteristics, a receiver operable to receive said signals after reflection from said objects, means in said receiver for separating said reflected signals in accordance with their respective distinct frequency characteristics, means to delay and combine said separated signals into a composite signal, and utilization means fed by the output of said last named means.

2. A pulse echo signal locator system comprising: an impulse transmitter for transmitting to remote objects a group of time spaced pulses each having a distinct frequency, a receiver operable to receive said signals after reflection from said objects, means in said receiver for separating said reflected signals in accordance with their respective distinct frequency characteristics, storage means in said receiver operative to delay each of said separated signals by an amount proportional to the time interval between the corresponding transmitted pulse and the end of the transmitted pulse group, means connected to the output of said storage means operative to combine said delayed signals into a composite signal and utilization means fed by the output of said last named means.

3. A pulse echo signal locator system comprising: an impulse transmitter operable to transmit to remote objects a group of time spaced pulses each having a distinct frequency, a receiver operable to detect said signals after reflection from said objects, a plurality of bandpass filters each connected to the output of said receiver and each designed to pass only the reflected signals returned from a respective transmitted pulse of the group of transmitted pulses in accordance with its distinct frequency characteristic; storage means connected to said plurality of filters to delay the respective outputs therefrom by an amount proportional to the time interval between the corresponding transmitted pulse and the end of the transmitted pulse group, means connected to the output of said storage means to combine said delayed signals to produce a composite signal, and indicator means to indicate the presence of said composite signal.

4. A pulse echo signal locator system comprising: an impulse transmitter operable to transmit to remote objects a group of time spaced pulses each having a distinct frequency, a receiver operable to detect said signals after reflection from said objects, storage means in said receiver connected to the output of said receiver to delay each of said received signals in proportion to the time position of the corresponding transmitted pulse relative to the end of the transmitted pulse group, a plurality of bandpass filters each connected to said storage means and each designed to pass only the reflected signals returned from a respective one of said transmitted pulses in accordance with its distinct frequency characteristic, combining means connected to the output of said filters to produce a composite signal of said delayed and filtered pulses, and indicator means to indicate the presence of said composite signal.

5. A pulse echo signal locator system comprising: an impulse transmitter operable to transmit to remote objects a group of time spaced pulses each having a distinct frequency, a radiator operable to radiate said group of pulses and operative responsive to signals reflected from said objects, a receiver coupled to said radiator operable to detect said reflected signals, a plurality of bandpass filters each connected to the output of said receiver and each designed to pass only the reflected signals returned from a respective one of said group of transmitted pulses in accordance with its distinct frequency characteristic, storage means connected to said plurality of filters to delay the respective outputs therefrom by an amount proportional to the time interval between the corresponding transmitted pulse and the end of the transmitted pulse group, means connected to the output of said storage means to combine said delayed signals to produce a composite signal, and indicator means to indicate the presence of said composite signal.

6. A pulse echo signal locator system comprising: an impulse transmitter system for transmitting to remote objects a group of pulses each of a distinct frequency characteristic, a receiver operable to receive said signals after reflection, means for maintaining said receiver insensitive to said reflected signals during transmission of said pulses, said group of transmitted pulses having a time spacing in accordance with the propagation velocity thereof and the number of pulses in said plurality to receive reflected signals from a number of pulses in direct proportion to the range of said objects, means in said receiver for separating said reflected signals in accordance with their respective distinct frequency characteristic, means to delay and combine said separated signals into a composite signal, and utilizing means fed by the output of said last named means.

7. A sonar pulse echo signal locator system comprising: an impulse transmitter operable to transmit to remote objects a group of time spaced pulses each having a distinct frequency, a transducer operable to convert said pulses to sound energy and operable to convert the signals reflected from remote objects to electrical signals, a receiver, isolating means for coupling said receiver and said transmitter to said transducer, said receiver operable to detect said signals of each of said group of pulses after reflection, a plurality of bandpass filters each connected to the output of said receiver and each designed to pass only the reflected signals returned from a respective one of said group of transmitted pulses in accordance with its distinct frequency characteristic, storage means connected to said plurality of filters to delay the respective outputs therefrom by an amount proportional to the time interval between the corresponding transmitted pulse and the end of the transmitted pulse group, means connected to the output of said storage means to combine said delayed signals to produce a composite signal, and indicator means to indicate the presence of said composite signal.

8. A pulse echo detection system comprising, an impulse transmitter for transmitting to remote objects a group of time spaced pulses each having a distinct frequency characteristic, a receiver operable to receive said pulses after reflection from said remote objects, delay means in the receiver for delaying the reflected signals returned from each of the transmitted pulses by an amount proportional to the time interval between the corresponding transmitted pulse and the end of the transmitted pulse group, means combining each of the delayed reflected signals to produce a composite signal, and utilization means fed by the output of said last named means.

9. A pulse echo detection system comprising an impulse transmitter for transmitting to remote objects a group of time spaced pulses each having a distinct frequency characteristic, a receiver operable to receive said pulses after reflection from said remote objects, signal recording and reproducing means in the receiver for recording the reflected signals returned from each transmitted pulse in the order of receipt thereof and for subsequently reproducing the same in the inverse order of recordation so as to bring each of the reflected signals returned from a given object into time coincidence upon reproduction, means for combining each of the reproduced signals into a composite signal, and utilization means fed by the output of said last named means.

10. An echo system comprising, in combination: means for transmitting sets of pulse signals, each set having a pulse repetition period which constitutes the basic pulse repetition period of the system, each pulse in each set being time-spaced from the others and being differentiable from the others in at least one electrical characteristic; means for receiving return signals from said transmitted pulses and for deriving a separate detected signal from the received signals resulting from each pulse; means for delaying each detected signal in inverse relationship to the time-spacing of its associated transmitted pulse with respect to the start of the basic repetition period of the system so that the returns from each pulse in a set are in time synchronism with the corresponding returns from the other pulses in that set; means for summing said delayed detected signals, an output being obtained from said summing means even when a single one of said delayed detected signals is applied thereto; and means for indicating the output of said summing means.

11. An echo system comprising, in combination: means for transmitting sets of pulse signals, each set having a pulse repetition period which constitutes the basic pulse repetition period of the system, each pulse in any set being time-spaced from the others and being transmitted at a different carrier frequency from the others; means for receiving return signals from said transmitted pulses and for deriving a separate detected signal from the received signals resulting from each pulse; means for delaying each detected signal in inverse relationship to the time-spacing of its associated transmitted pulse with respect to the start of the basic repetition period of the system so that the returns from each pulse in a set are in time synchronism with the corresponding returns from the other pulses in that set; means for summing the delayed detected signals of each set, an output being obtained from said summing means even when a single one of said delayed detected signals is applied thereto; and means for indicating the output of said summing means.

12. An echo system comprising, in combination: means for transmitting sets of pulse signals, each set having a pulse repetition period which constitutes the basic pulse repetition period of the system, each pulse is any set being equally time-spaced from the others and being transmitted at a different carrier frequency from the others; means for receiving return signals from said transmitted pulses and for deriving a separate detected signal from the received signals resulting from each pulse; means for delaying each detected signal in inverse relationship to the time-spacing of its associated transmitted pulse with respect to the start of the basic repetition period of the system so that the returns from each pulse in a set are in time synchronism with the corresponding returns from the other pulses in that set; means for summing the delayed detected signals of each set, an output being obtained from said summing means even when a single one of said delayed detected signals is applied thereto; and means for indicating the output of said summing means.

References Cited by the Examiner
UNITED STATES PATENTS

| | | | |
|---|---|---|---|
| 2,179,509 | 11/39 | Kietz | 177—386.1 |
| 2,394,990 | 2/46 | Eisler et al. | 177—352.7 |
| 2,418,156 | 4/47 | Bollman | 177—386.1 |
| 2,638,586 | 5/53 | Guanella | 343—9 |
| 3,064,234 | 11/62 | Barrett | 340—3 |

CHESTER L. JUSTUS, *Primary Examiner.*

NORMAN H. EVANS, JAMES L. BREWRINK, HILLET MARANS, *Examiners.*